(12) United States Patent
Okamoto et al.

(10) Patent No.: US 8,714,585 B2
(45) Date of Patent: May 6, 2014

(54) KNEE AIRBAG

(75) Inventors: Masakazu Okamoto, Yokohama (JP);
Akifumi Hanawa, Yokohama (JP);
Takashi Ohshima, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/579,792

(22) PCT Filed: Feb. 2, 2011

(86) PCT No.: PCT/JP2011/052162
§ 371 (c)(1),
(2), (4) Date: Aug. 17, 2012

(87) PCT Pub. No.: WO2011/102225
PCT Pub. Date: Aug. 25, 2011

(65) Prior Publication Data
US 2013/0015646 A1    Jan. 17, 2013

(30) Foreign Application Priority Data

Feb. 17, 2010    (JP) ................................. 2010-031885

(51) Int. Cl.
*B60R 21/231*    (2011.01)
(52) U.S. Cl.
USPC ....................................... 280/730.1; 280/740
(58) Field of Classification Search
USPC ......... 280/728.2, 730.1, 730.2, 732, 742, 740
See application file for complete search history.

(56) References Cited

U.S. PATENT DOCUMENTS

| 7,303,207 B2 * | 12/2007 | Asai et al. ...................... 280/738 |
| 7,530,597 B2 * | 5/2009 | Bito ............................... 280/742 |
| 7,942,440 B2 * | 5/2011 | Choi .............................. 280/740 |
| 2003/0120409 A1 | 6/2003 | Takimoto et al. |
| 2004/0245750 A1 * | 12/2004 | Takimoto et al. .......... 280/730.1 |
| 2005/0073134 A1 * | 4/2005 | Matsuura et al. .......... 280/730.1 |
| 2005/0230941 A1 | 10/2005 | Takimoto et al. |
| 2007/0126212 A1 | 6/2007 | Takimoto et al. |

(Continued)

FOREIGN PATENT DOCUMENTS

| CN | 101011957 | 8/2007 |
| DE | 10 2007 000 069 | 8/2007 |
| DE | 60233851 | 11/2009 |
| EP | 1 310 408 | 5/2003 |

(Continued)

OTHER PUBLICATIONS

International Search Report of PCT/JP2011/052162, Mailed on May 10, 2011, 4 pages.

*Primary Examiner* — Paul N Dickson
*Assistant Examiner* — Robert A Coker
(74) *Attorney, Agent, or Firm* — Brinks Gilson & Lione

(57) ABSTRACT

An airbag in which no choking occurs and which can be rapidly deployed. A cushion section of the airbag internally accommodates a cylinder-type inflator that includes an insertion hole for inserting the inflator from an outside to an inside, and a diffuser into which the inflator is inserted, and a diffuser having a tubular portion obtained by folding back a section of cloth to form symmetrical portions with an upper base formed by the folded back part and a lower base formed by adjacent ends of the symmetrical portions. The cushion section is folded back at both lateral sides of the along first folding lines that are substantially orthogonal to a longitudinal direction of the diffuser.

9 Claims, 18 Drawing Sheets

(56) References Cited

U.S. PATENT DOCUMENTS

| | | |
|---|---|---|
| 2007/0182134 A1 | 8/2007 | Mizuno et al. |
| 2008/0157509 A1* | 7/2008 | Abe et al. .................. 280/730.1 |
| 2009/0184498 A1 | 7/2009 | Takimoto et al. |
| 2009/0212542 A1* | 8/2009 | Toda et al. ................. 280/730.2 |
| 2009/0230661 A1* | 9/2009 | Fukawatase et al. ...... 280/730.1 |
| 2010/0007120 A1* | 1/2010 | Adachi et al. ............. 280/730.1 |

FOREIGN PATENT DOCUMENTS

| | | |
|---|---|---|
| EP | 2 110 285 | 10/2009 |
| JP | 2003-182504 | 7/2003 |
| JP | 2004 330959 | 11/2004 |
| JP | 2007-203937 | 8/2007 |
| JP | 2008-155888 | 7/2008 |
| JP | 2010-006333 | 1/2010 |

* cited by examiner (a)

(b)

(c)

KNEE AIRBAG

BACKGROUND

1. Field of the Invention

The present invention relates to a knee airbag accommodated below an instrument panel.

2. Related Technology

A knee airbag is an occupant restraining device that is inflated and deployed in the vicinity of the occupant's knees when a vehicular accident occurs. By providing the knee airbag, it is possible to protect the occupant's knees from collision with the instrument panel and the like.

The knee airbag is mainly accommodated below the instrument panel, for example, inside the lower section of the steering column cover on the driver's seat side of the vehicle. To enable the attachment in a limited accommodation state, the knee airbag is compacted by folding or winding and attached in this state. When an accident occurs, the knee airbag receives the supply of gas from an inflator (gas generator) and is inflated and deployed inward of the occupant cabin of the vehicle.

The knee airbag should be inflated and deployed within a space from below the instrument panel to the occupant's knees. Since this space is extremely narrow, the knees cannot be prevented from colliding with the instrument panel, unless the inflation and deployment proceed rapidly. Therefore, the knee airbag is configured by using such measures as a folding method ensuring instantaneous deployment or a method enabling smoother inflow of the gas.

For example, Japanese Patent Application Publication No. 2004-330959 discloses an occupant airbag device of a bag-body type for protection of knees that is provided with an internal inflator inserted into a substantially cylindrical diffuser (flow adjusting device). According to this document, the first to third flow-adjusting openings of different opening areas are formed in the diffuser, and by using those openings, it is possible to deploy the knee-protecting airbag before the deployment of the bag for head and chest protection.

With the technique such as described in the above mentioned reference, the tubular diffuser has a large length, thereby making it possible to guide the gas at an accordingly high speed in the desired direction. Therefore, the airbag easily expands in the left-right direction, which is the longitudinal direction of the diffuser, and the deployment proceeds rapidly. However, outlet ports at both ends of such a long diffuser are closed by folding when the airbag is accommodated, thereby causing the so-called choking, that is, a state in which the gas cannot be smoothly ejected from both ends of the tubular diffuser when the airbag is inflated and deployed.

SUMMARY OF THE INVENTION

With the foregoing in view, it is an object of the present invention to provide a knee airbag in which no choking occurs and which can be rapidly deployed.

In order to resolve the abovementioned problem, the present invention, in a representative configuration thereof, provides a knee airbag internally accommodating a cylinder-type inflator, including: an insertion hole for inserting the inflator from an outside to an inside; and a diffuser into which the inflator that has been inserted from the insertion hole is inserted, the diffuser having a tubular portion obtained by folding back hexagonal cloths along any diagonal, stacking the substantially congruent and left-right symmetrical trapezoidal cloths by taking the diagonal as an upper base, and sewing a portion corresponding to a lower base of the trapezoid to a foundation cloth, and the inflator being inserted into the tubular portion close to the lower base, wherein the diffuser is folded back at both outer sides of the portion corresponding to the lower base of the diffuser along creases that are substantially orthogonal to the longitudinal direction of the diffuser.

With the above-described configuration, a knee airbag is obtained in which no choking occurs and which is rapidly deployed. This is because the lower base, which has a small length, does not engage with the creases, and the inflator is inserted close to the lower base, as a result of which the gas outlet ports are not closed.

The creases may be also positioned on the inner side of both ends of the portion corresponding to the upper base of the diffuser.

With the above-described configuration, the upper base portions of the diffuser engage with the folds. However, since the vicinity of the lower base where the inflator is present is not engaged, no choking occurs. Meanwhile, rapid deployment is ensured since the upper base portions are increased in length in the course of engagement with the folds.

In order to resolve the abovementioned problem, the present invention, in a representative configuration thereof, provides a knee airbag in which a cylinder-type inflator is accommodated in an internal diffuser, wherein: a roll section is formed by folding or winding in an accordion-like or roll-like configuration in the knee airbag, and both ends of the roll section are folded back to a center, and outlet ports of the diffuser are not engaged with the folds.

The present invention can provide a knee airbag in which no choking occurs and which can be rapidly deployed.

DETAILED DESCRIPTION

Figure 1:
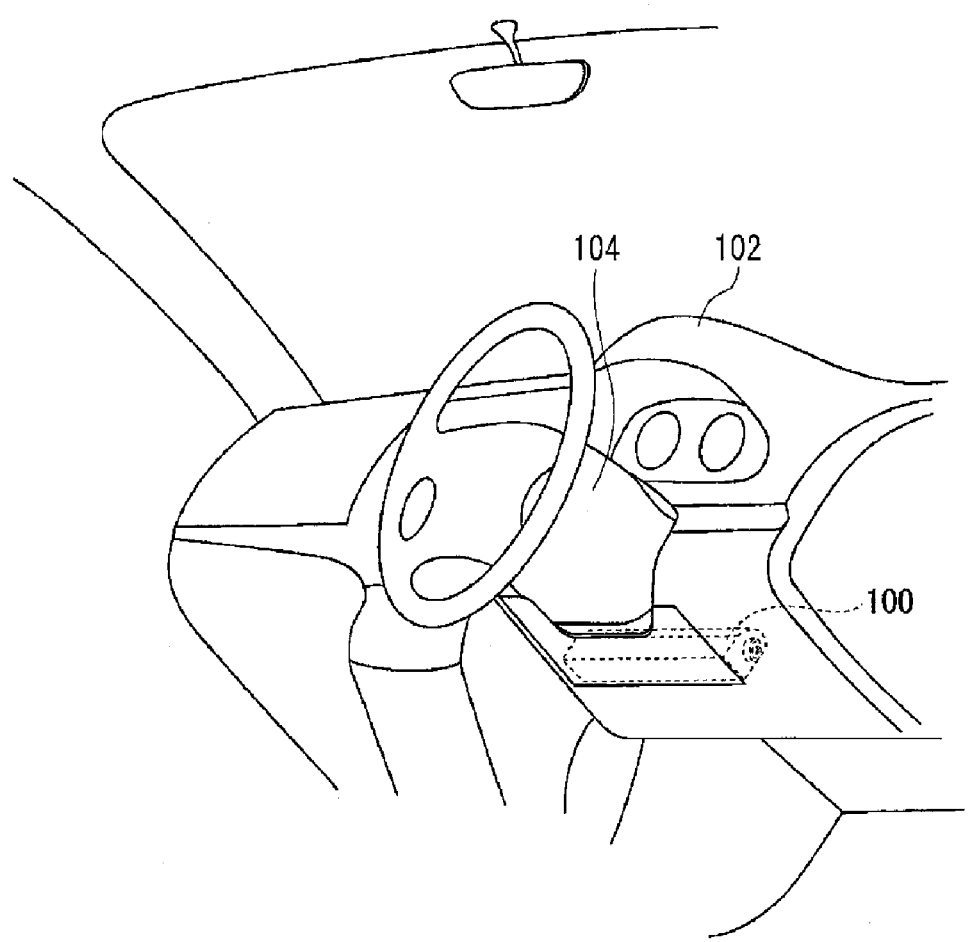
FIG. 1 illustrates an accommodation position of the knee airbag of an embodiment of the present invention in a vehicle.

The preferred embodiments of the present invention will be described below in greater detail with reference to the appended drawings. The dimensions, materials, and other specific numerical values are exemplified to facilitate the understanding of the invention and are not intended to limit the present invention, unless specifically indicated otherwise. Meanwhile, in the description of the invention and drawings, the elements having substantially the same function and structure are denoted by the same reference numerals and the redundant explanation thereof will be omitted. In addition, the elements that are not directly related to the invention will not be shown.

FIG. 1 illustrates by way of example an accommodation position for a knee airbag in a vehicle in an embodiment of the present invention. A knee airbag 100 is accommodated below an instrument panel 102. The knee airbag 100 of the present embodiment is designed for a driver seat and accommodated below a steering column bar 104. When an impact is generated in the event of collision or the like, the knee airbag 100 is inflated and deployed inside the occupant cabin of the vehicle. The knee airbag 100 can be also used as an airbag for a passenger (such a configuration is not shown in the figure).

Figure 2:
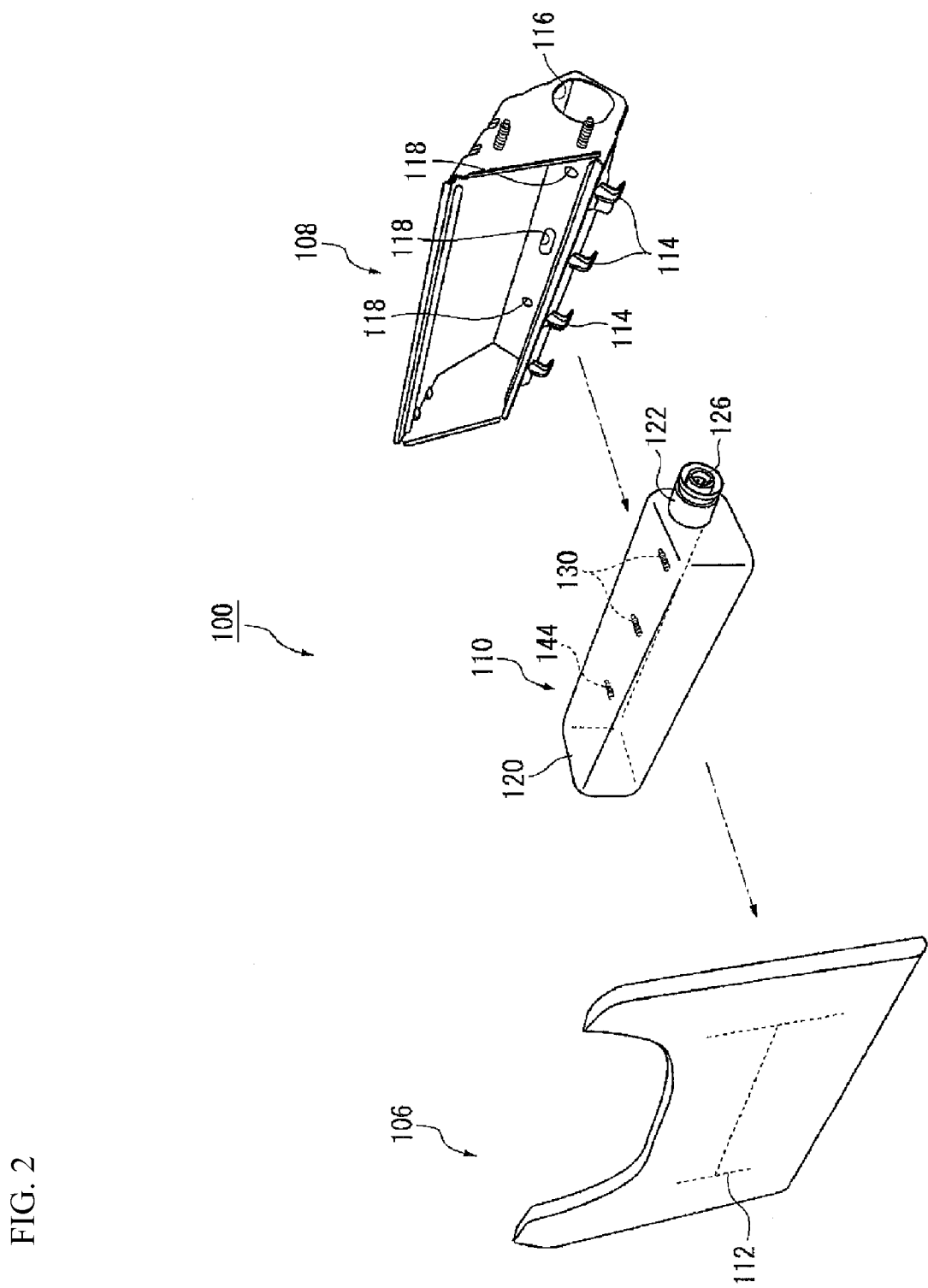
FIG. 2 is an exploded view of the knee airbag shown in FIG. 1.

FIG. 2 is an exploded view of the knee airbag shown in FIG. 1. As shown in FIG. 2, the knee airbag 100 is configured to provide a folded cushion section 110 in a space between a knee airbag cover 106 and a housing 108.

The knee airbag cover 106 is exposed as an interior member inside the vehicle. A tear line 112 that is cleaved when the cushion section 110 is inflated and deployed is cut on the inner side (cushion section 110 side) of the knee airbag cover 106.

The housing 108 is a box serving as an exterior part with respect to the cushion section 110. The housing 108 encloses the cushion section 110 and is attached to the vehicle. A plurality of hook sections 114 for attaching the knee airbag cover 106 is provided in the housing 108. The housing 108 is preferably constituted by a highly rigid material in order to support the inflating and deploying cushion section 110, and the housing 108 of the present embodiment is made from a metal.

The housing 108 is provided with an inflator attachment hole 116 and a bolt hole 118. One end (connector 126 side) of an inflator 122 that is inserted into the cushion section 110 is attached to the inflator attachment hole 116. A stud bolt 130 and a fusion bolt 144 provided at the inflator 122 are passed through the bolt hole 118 and fixed therein.

The cushion section 110 is a member that inflates and deploys to protect the occupant. The cushion section 110 is compacted by folding and winding and attached in such a state inside the housing 108. The cushion section 110 is wrapped with a flap 120 for maintaining the folded state thereof. The flap 120 is a thin fabric that can be easily torn by the inflation and deployment of the cushion section 110. The inflator 122 serving as a source for supplying a gas for inflation and deployment is inserted into the cushion section 110.

Figure 3:
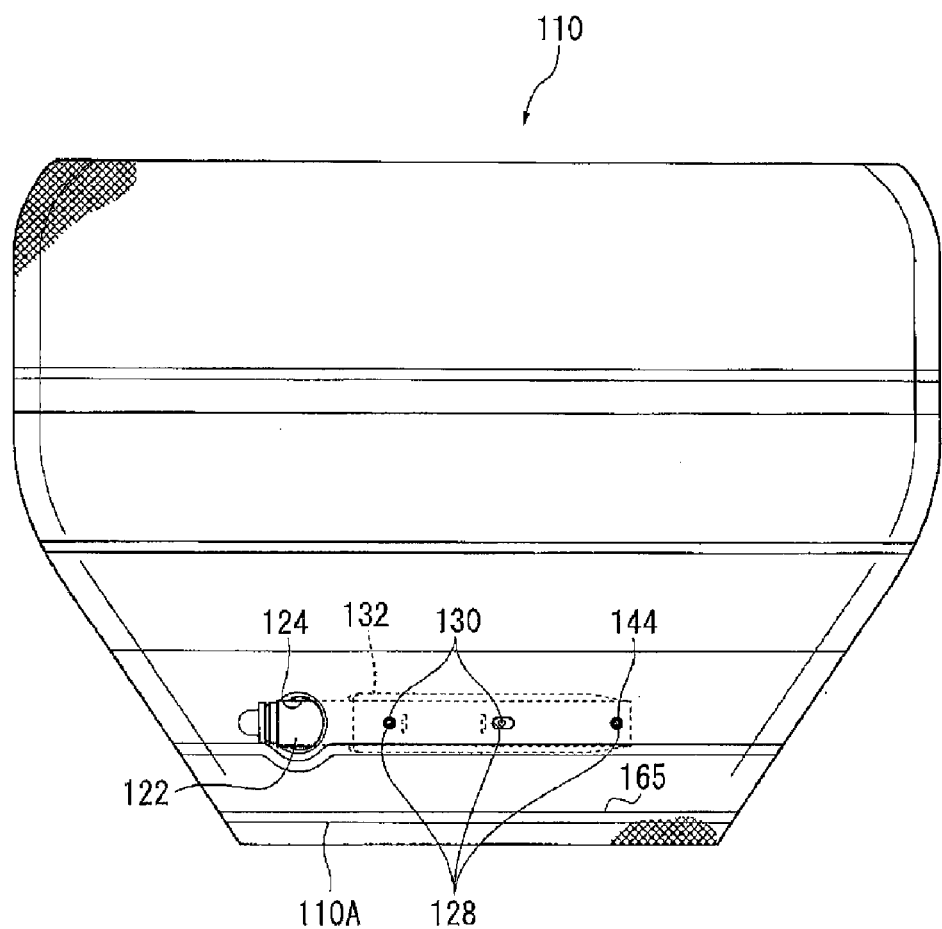
FIG. 3 illustrates the deployment state of the cushion section shown in FIG. 2.

FIG. 3 illustrates the deployed state of the cushion section 110 shown in FIG. 2. As shown in FIG. 3, the cushion section 110 is formed by sewing the foundation cloth constituting the front surface of the cushion section on the front and rear sides.

The cushion section 110 is provided with an insertion hole 124 for inserting, from the outside to the inside, the inflator 122 inserted into a deflector 132. In a folded state of the cushion section 110, one end (connector 126 side) of the inflator 122 is exposed from the insertion hole 124 (see FIG. 2). After the cushion section 110 has been accommodated in the housing 108, a wiring (not shown in the figure) for an output signal is connected through the inflator attachment hole 116 to the connector 126. The cushion section 110 is provided with a bolt hole 128, and the stud bolt 130 and the fusion bolt 144 of the inserted inflator 122 can be exposed to the outside.

FIGS. 4(a)-(c) illustrate the deflector 132 accommodating the inflator 122 shown in FIG. 3. FIG. 4(a) is an exploded view of the deflector 132 and the inflator 122 shown in FIG. 3. FIG. 4(b) is a view along an arrow A of the deflector 132 and the inflator 122 shown in FIG. 4(a). FIG. 4(c) is a view along an arrow B of the deflector 132 and the inflator 122 shown in FIG. 4(b). FIG. 4(d) is a view along an arrow C shown in FIG. 4(b).

As shown by way of example in FIG. 4(c), the inflator 122 is of a cylinder type. The inflator 122 has an igniter and a gas-generating agent inside thereof, and where an output signal is received from the connected wiring (not shown in the figure), the igniter is actuated, the gas-generating agent located around the igniter is instantaneously burned, and a gas for airbag inflation and deployment is generated. The generated gas is supplied into the cushion section 110 from a gas ejection port 134 provided in the front surface of the inflator 122.

As shown by way of example in FIG. 4(b), the inflator 122 has the stud bolt 130. The stud bolt 130 passes through the bolt hole 136 of the deflector 132, the bolt hole 128 of the cushion section 110, and the bolt hole 118 of the housing 108 and fastens the aforementioned components.

As shown in FIG. 4(b), the deflector 132 is a member that regulates the flow of gas ejected from the inflator 122. In a state in which one end of the inflator 122 is exposed, the deflector 132 accommodates at least the gas ejection port 134.

An end section 138 of the deflector 132 on the fused bolt 144 side has a tapered shape. Further, as shown in FIG. 4(c), the end section 138 is subjected to bending by which the distal end corner 140 is rounded. As a result, the deflector can be smoothly inserted into the cushion section 110, without being hooked.

As shown in FIG. 4(c), the deflector 132 fixes the inflator 122 so that the gas ejection port 134 of the inflator 122 is positioned substantially in the center of the deflector in the longitudinal direction thereof. The deflector 132 has a flow regulating portion 142 where the inflator 122 is not present, this portion serving to regulate the gas flow. As a result of providing the flow regulating portion 142, the gas flow is regulated in the longitudinal direction of the deflector 132 (width direction thereof inside the cushion section 110). The deflector 132 is made from a metal and functions not only to regulate the gas flow, but also to protect the cushion section 110 from the heat generated by the gas.

As shown in FIG. 4(a), the deflector 132 is provided with the bolt hole 136 through which the stud bolt 130 of the inflator 122 passes. The deflector 132 is fixed, together with the inflator 122 and the cushion section 110, by the stud bolt 130 to the housing 108 (see FIG. 2). Furthermore, the deflector 132 has the fusion bolt 144 (see FIG. 4(b)) and is also fixed to the housing 108 by the fusion bolt.

Figure 4:
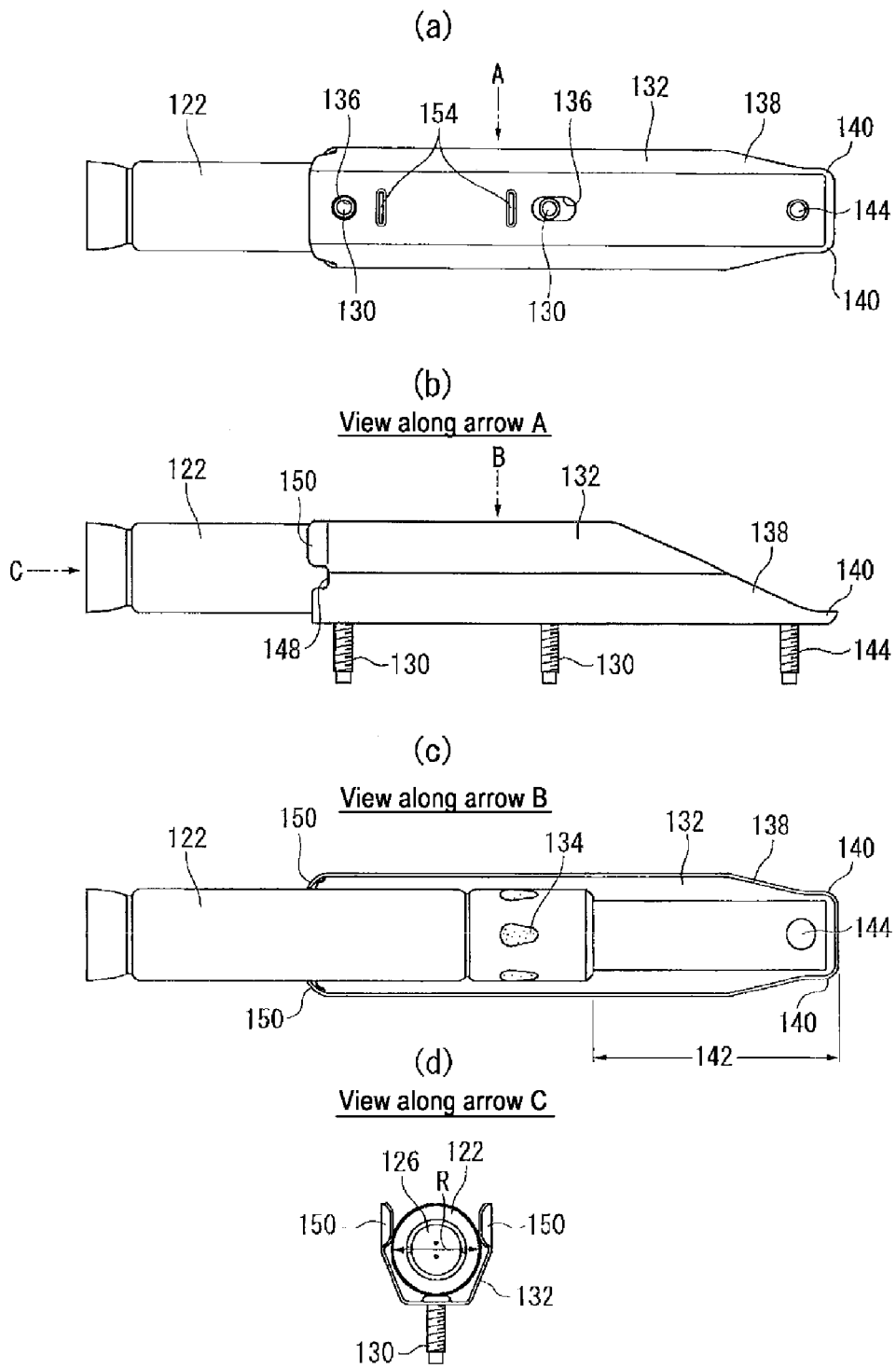
FIGS. 4(a)-4(d) illustrate a deflector accommodating the inflator shown in FIG. 3 with FIG. 4(b) being a view in the direction of arrow A in FIG. 4(a), with FIG. 4(c) being a view in the direction of arrow B in FIG. 4(b), and with FIG. 4(d) being a view in the direction of arrow C in FIG. 4(b).
Figure 5:
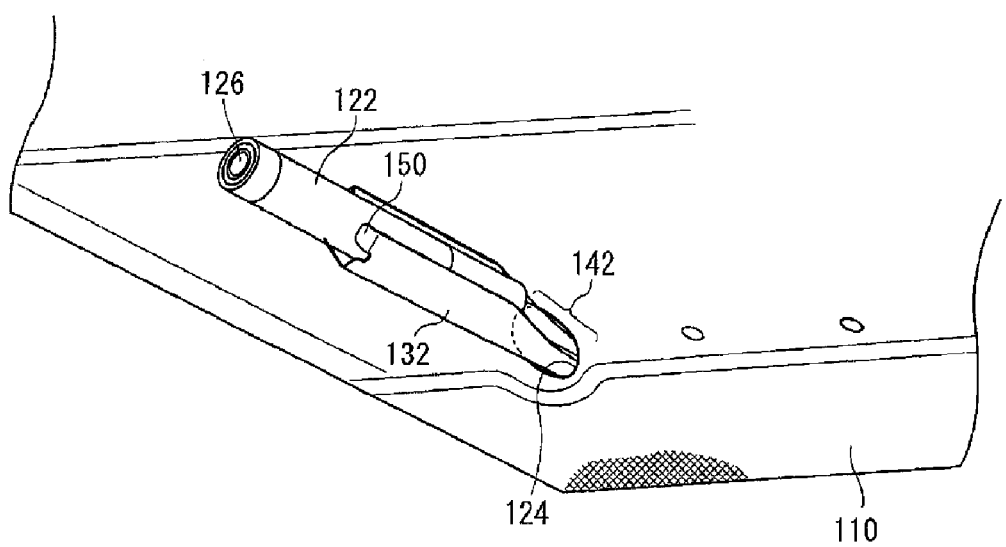
FIG. 5 illustrates how the inflator shown in FIG. 4 is inserted together with the deflector from an insertion hole into the cushion section shown in FIG. 3.

FIG. 5 illustrates by way of example the state in which the inflator 122 shown in FIG. 4 is inserted together with the deflector 132 from the insertion hole 124 into the cushion section 110 shown in FIG. 3. The connector 126 is usually provided at one end of the inflator 122, and a wiring for sending an external signal is connected to the igniter located inside thereof. Therefore, as a result of positioning the inflator 122 with respect to the deflector 132 by the stud bolt 130 of the inflator and exposing one end of the inflator 122 from the deflector 132 and the cushion section 110, the wiring can be easily connected. Meanwhile, because of the abovementioned positioning, the deflector 132 is provided with the flow regulating portion 142 where the inflator 122 is not present, this portion serving to regulate the gas flow.

In the present embodiment, by providing the deflector 132 with a clutch 150, it is possible to accommodate the inflator 122 in a state in which one end thereof is exposed, and fix the inflator 122 in a posture aligned with the deflector 132 although there exists the flow regulating portion 142 where the inflator 122 is not present. Therefore, when the deflector 132 is inserted into the cushion portion 110, the inflator 122 can be reliably prevented from falling out of the deflector 132.

Figure 6:
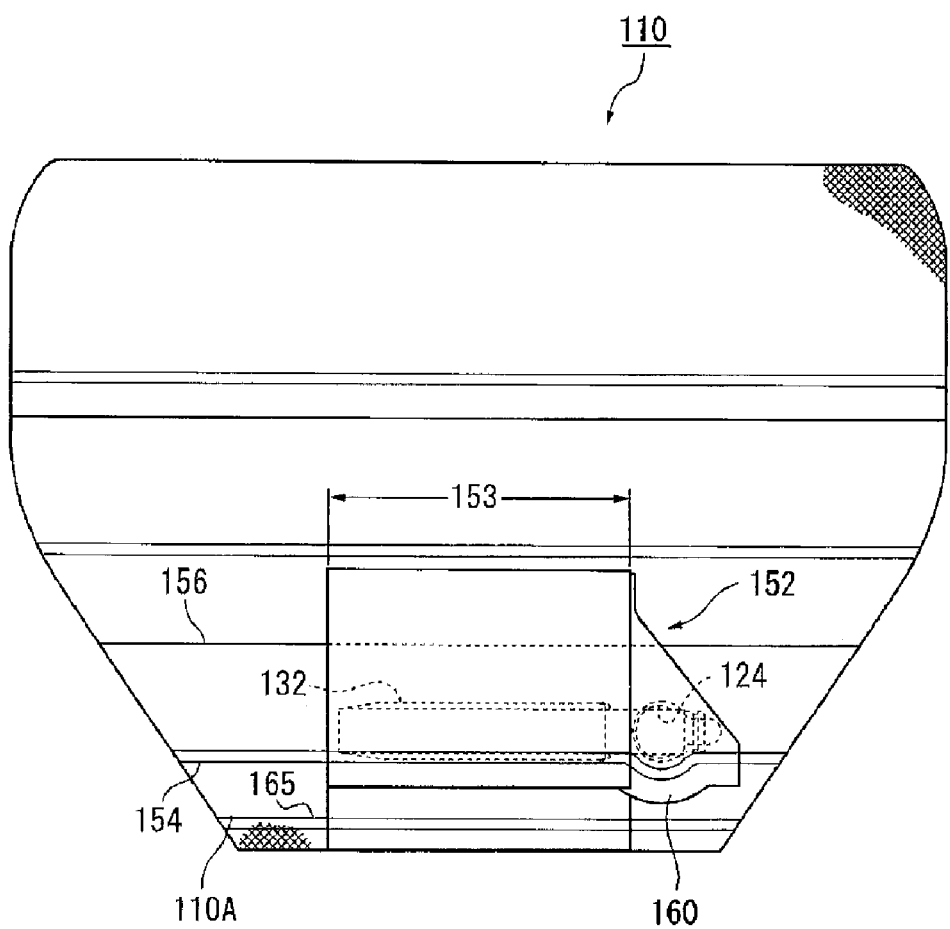
FIG. 6 is a view from the inside of the turned-over cushion section shown in FIG. 3.

In FIG. 6, the cushion section 110 shown in FIG. 3 is turned over and viewed from the inside thereof. Thus, the foundation cloth located on the opposite side is omitted in the figure. A diffuser 152 having inserted therein the inflator 122 and the deflector 132 that have been inserted through the insertion hole 124 is provided on the rear side of a foundation cloth 110A where the insertion hole 124 shown in FIG. 3 has been provided. In FIG. 6, the insertion hole 124 and the deflector 132 (accommodating the inflator 122 inside thereof) are not seen and therefore shown by broken lines. As a result of inserting the inflator 122 together with the deflector 132 into the diffuser 152, the flow of gas supplied from the inflator 122 can be regulated in the left-right direction in FIG. 6.

The foundation cloth 110A is provided with a first sewing line 154 and a second sewing line 156, and the insertion hole 124 is positioned between the sewing lines.

Figure 7:
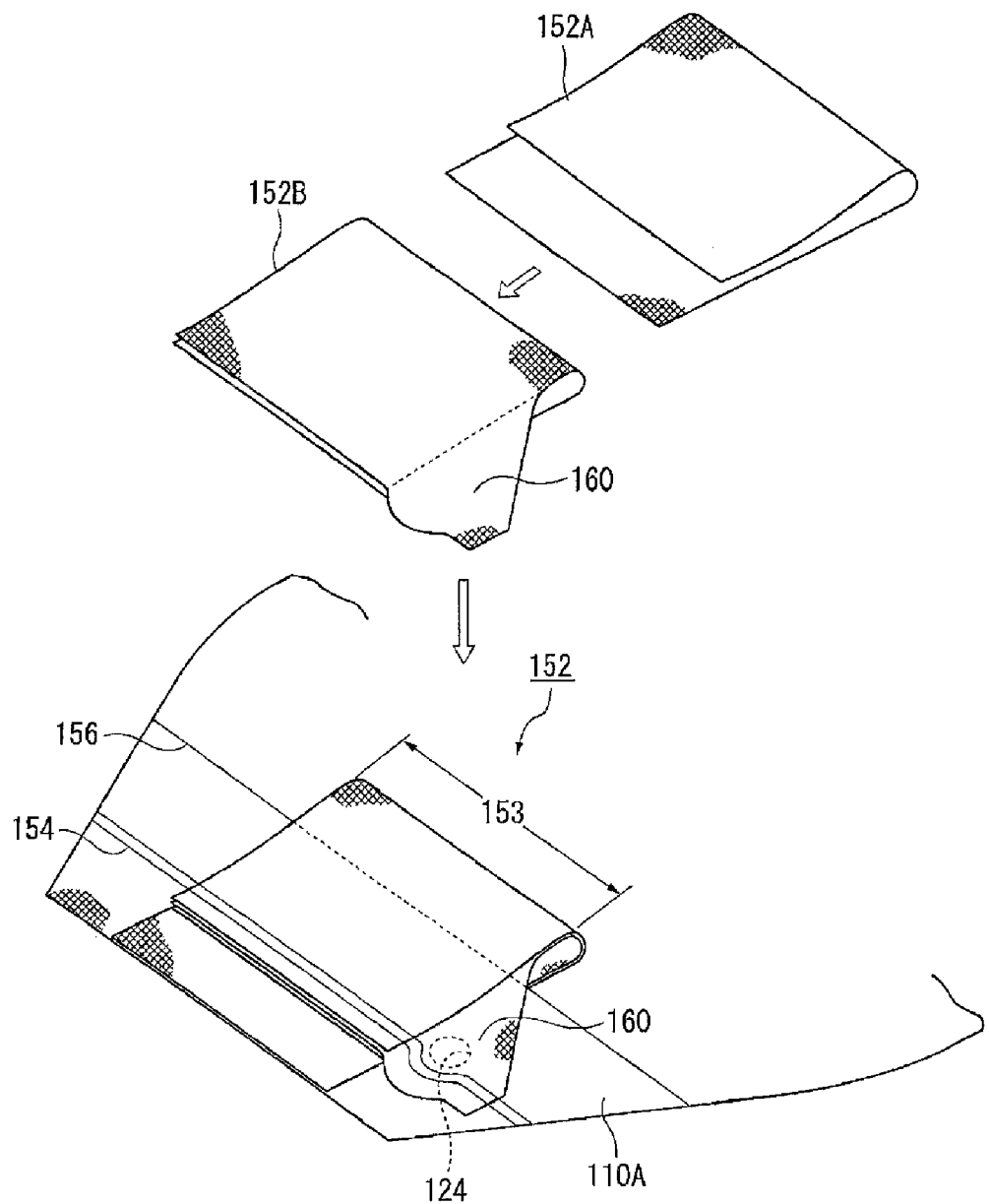
FIG. 7 is an exploded view of the diffuser shown in FIG. 6.

FIG. 7 is an exploded view of the diffuser shown in FIG. 6. In FIG. 7, the inflator 122 and the deflector 132 are omitted. As shown in FIG. 7, the diffuser 152 is obtained by folding two diffuser cloths 152A, 152B and inserting one folded cloth into another. A portion where the diffuser cloths 152A, 152B are folded and overlapped is sewed to the foundation cloth 110A by the first sewing line 154. As a result, the diffuser 152 is provided with a double-wall tubular shape. In the present embodiment, the diffuser 152 has a double-wall tubular shape, but the number of the cloths can be increased and decreased and the diffuser may accordingly have a single-wall tubular shape or a tubular wall constituted by three or more walls.

The sewing procedure is described below. First, the overlapping diffuser cloths 152A, 152B are sewed by the second sewing line 156 to the inner side of the airbag body. Then, as shown in FIG. 7, the diffuser cloths 152A, 152B are folded and sewed by the first sewing line 154. It is not until the sewing with the first sewing line 154 that the diffuser 152 assumes a tubular shape.

The cloth on the side close to the foundation cloth 110A, from the tubular portion 153 of the diffuser 152, is further sewed to the foundation cloth 110A by the second sewing line 156.

The cloth 152B on the innermost side of the double-wall tubular shape of the diffuser 152 has a guide member 160. The guide member 160 covers the insertion hole 124 by the surface continuing from the inner surface (inner surface of the folded cloth 152B) of the diffuser 152. The guide member 160 is sewed to the foundation cloth 110A by the first sewing line 154.

Figure 8:
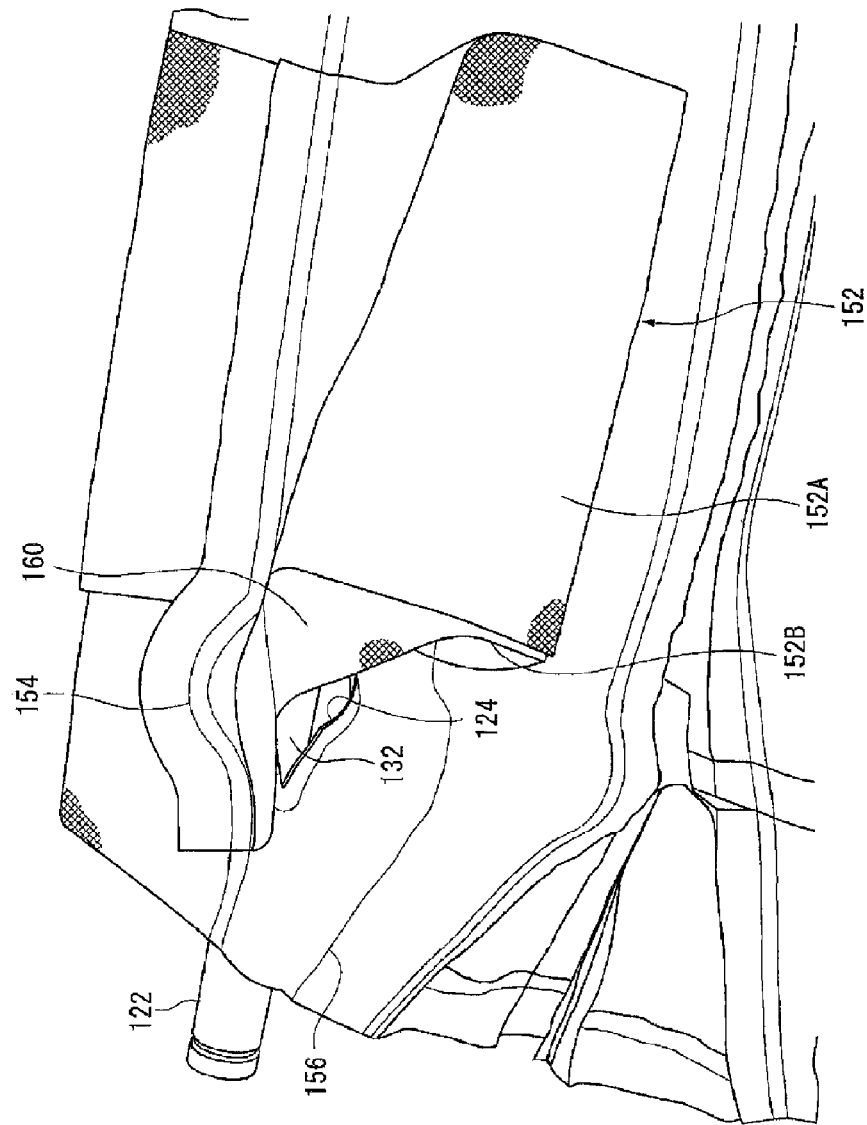
FIG. 8 is a view from the inside of the cushion section 110 shown in FIG. 5.

FIG. 8 is a view of the cushion section 110, which is shown in FIG. 5, that is taken from the inside thereof. In the configuration described hereinabove, the distal end of the inflator 122 (actually, the deflector 132 that accommodates the inflator 122) inserted from the insertion hole 124 hits the guide member 160 of the diffuser 152. The surface of the guide member 160 that has been hit continues from the inner surface of the diffuser 152 (inner surface of the folded cloth 152B). Therefore, although the tubular portion 153 of the diffuser 152 is separated from the insertion hole 124 (see FIG. 6 and FIG. 7) to prevent choking, where the inflator 122 is inserted as shown in FIG. 8, the inflator 122 is guided by the guide member 160 and can be inserted into the diffuser 152, as shown in FIG. 6, without a deviation.

Since the guide member 160 of the diffuser 152 is a single-layer cloth and is not of tubular shape, the guide member essentially cannot function as the diffuser 152. Therefore, the guide member 160 does not cause choking. However, the guide member 160 is sewed to the foundation cloth 110A by the first sewing line 154. As a result, even though the inserted inflator 122 and the deflector 132 collide, no displacement is caused thereby, and the two can be guided by the inner surface of the diffuser 152.

In the conventional configuration, the diffuser 152 is shortened because of the choking problem. As a result, the diffuser 152 does not overlap the insertion hole 124 and is disposed at a certain distance from the insertion hole 124, thereby making it necessary to move and insert the distal end of the inserted inflator 122 as far as the end portion of the diffuser 152. In this case, the inflator 122 can erroneously deviate to the outside of the diffuser 152, but the present embodiment resolves this problem.

When the diffuser 152 is configured to have a multiwall tubular shape in order to increase the strength of the diffuser 152, as in the present embodiment, the inflator 122 should be inserted in the innermost tube, that is, the diffuser cloth 152B. Accordingly, the diffuser cloth 152B on the innermost side is provided with the guide member 160. As a result, it is possible to prevent not only the deviation of the inflator 122 to the outside of the diffuser 152, but also the penetration of the inflator 122 into a gap between the multiple tubes (between the diffuser cloths 152A, 152B) constituting the diffuser 152.

Further, as shown in FIG. 6, in the present embodiment, the tubular portion 153 of the diffuser 152 has a rectangular cross section. The tubular portion 153 is configured to have the rectangular cross section in order to maximize the flow regulating action of the tubular portion 153 that essentially functions as a diffuser.

The specific feature of the present embodiment is that the airbag accommodating the cylinder-type inflator inside thereof has the insertion hole, essentially an opening, for inserting the inflator from the outside to the inside of the airbag, thereby providing the diffuser forming a semi-closed space and the guide portion that introduces the inflator to the semi-closed space when the inflator is inserted.

The abovementioned guide member may be connected to the edge portion of the opening so as to guide the inflator from the insertion hole to the opening in a generally continuous manner.

The above-mentioned guide member may be provided such as to generally overlap the insertion hole so as to guide the inflator from the insertion hole to the opening in a generally continuous manner.

Figure 9:
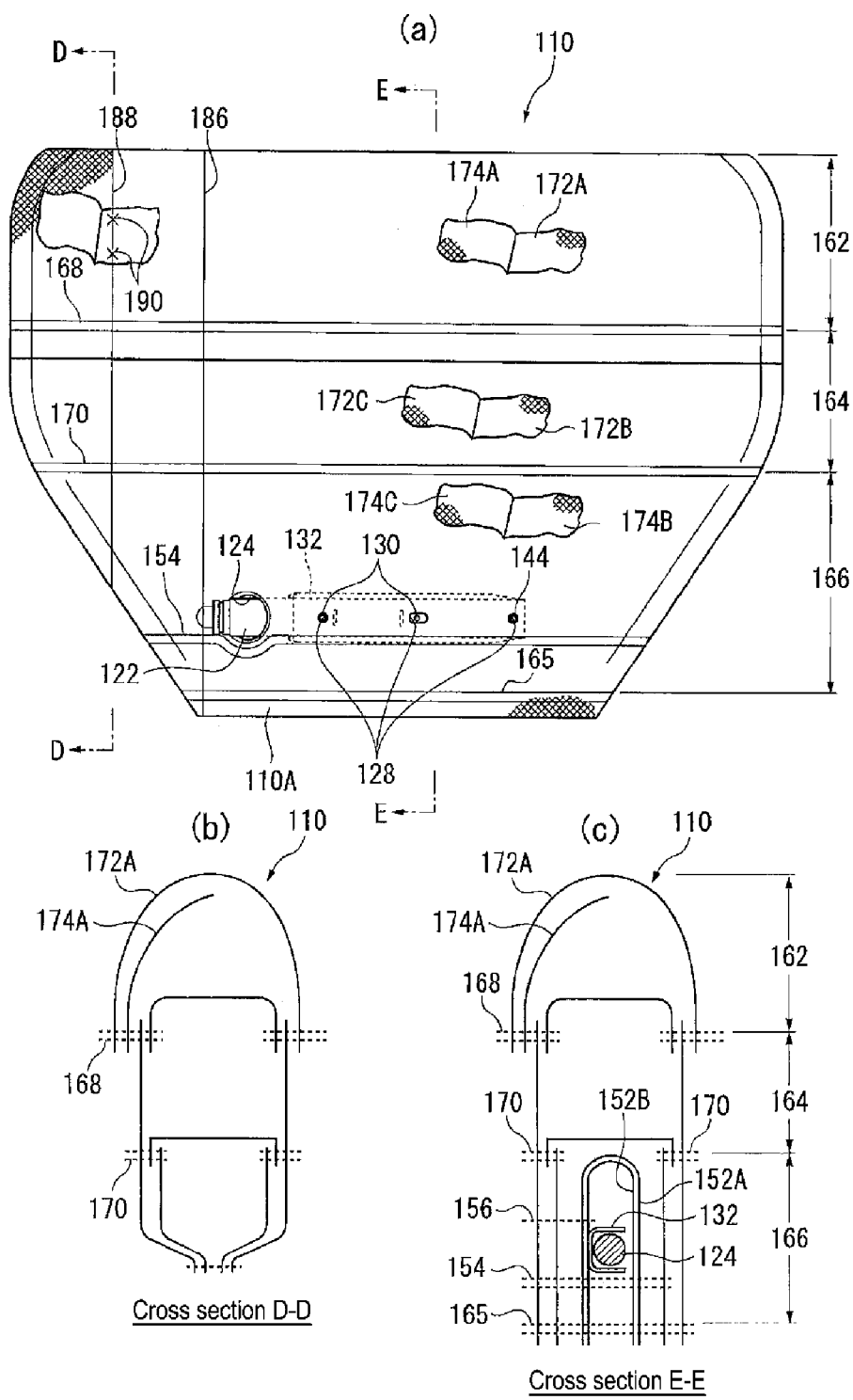
FIG. 9(a) is a view in which part of the cushion section shown in FIG. 3 is cut out and the inner surface of each chamber is exposed.
FIG. 9(b) is a view generally taken along line D-D in FIG. 9(a).
FIG. 9(c) is a view generally taken along line E-E in FIG. 9(a).

In FIGS. 9(a)-9(c), the cushion section 110 shown in FIG. 3 is partially cut out and the inner surface of each chamber is exposed. FIG. 9(a) is a front view of the cushion section 110. FIG. 9(b) is a sectional view along line D-D of the configuration shown in FIG. 9(a) in which the cushion section 110 is cut by a second folding line 188. FIG. 9(c) is a sectional view along line E-E of the configuration shown in FIG. 9(a) in which the cushion section 110 is cut in the center. As shown in FIGS. 9(a)-9(c), the cushion section 110 is provided with three (first to third) chambers 162, 164, 166. The first chamber 162 and the second chamber 164 are of substantially rectangular shapes and are adjacent to each other at a boundary (third sewing line 168) extending in the longitudinal direction (left-right direction in FIG. 9) in which the two chambers are of substantially equal dimensions.

The third chamber 166 is of a substantially trapezoidal shape having an upper base (fourth sewing line 170) that is substantially equal in size to the abovementioned longitudinal boundary and a lower base (outer peripheral sewing line 154) that is shorter than the fourth sewing line 170. The third chamber 166 is adjacent to the second chamber 164 at the fourth sewing line 170. The third chamber 166 accommodates the cylinder-type inflator 122 close to the first sewing line 154, the inflator extending along this sewing line.

FIG. 9(b) and FIG. 9(c) show how many foundation cloths are sewed by each of the first to fourth sewing lines 154, 156, 168, 170 and how the foundation cloths are sewed.

As shown in FIG. 9(a), the inner surface of one foundation cloth on the rear side in the figure, from among the two overlapping foundation cloths forming the first chamber 162, is a silicone-coated coated cloth 172A. The outer surface of this foundation cloth abuts against the occupant's knees and restricts the forward movement of the occupant. Meanwhile, the inner surface of the other foundation cloth on the front side in the figure, from among the two overlapping foundation cloths forming the first chamber 162, is a non-coated cloth 174A that is not coated with silicone.

The first chamber 162 may be constituted by the foundation cloth of any weight, but the coated cloth 172A and the non-coated cloth 174A are the two innermost cloths forming the first chamber 162. Cloths of dissimilar materials may be used, provided they are at the inner surface of the first chamber 162, and the materials at the front and rear sides may be interchangeable.

With the above-described configuration, damage that can easily occur in the first chamber 162 can be prevented. Since the first chamber 162 is the farthest from the inflator 122, it is a portion into which the gas is supplied with the largest delay. When the cushion section 110 is deployed, the folded or wound portion remains in the first chamber 162 to the very end. Since the deployment of the cushion section 110 is thus delayed, tension and twisting occur in other portions that are deployed earlier, friction easily occurs between the inner surfaces, and the damage easily occurs.

Accordingly, in the present embodiment, the portion where the friction easily occurs is from the coated cloth 172A and the non-coated cloth 174A as described hereinabove. This is done so because even if the friction occurs between those dissimilar cloths, they can be prevented from damage much more effectively than in the case where the friction occurs between the cloths of the same kind.

The inner surface of the foundation cloth of the second chamber is the coated cloth 172B, 172C on both the rear side and the front side, as shown in the figure. The inner surface of the foundation cloth of the third chamber 166 is the non-coated cloth 174B, 174C on both the rear side and the front side, as shown in the figure. However, the coated cloth is used on both sides for the outer surface (not shown in the figure) of the foundation cloth of the third chamber 166.

Figure 10:
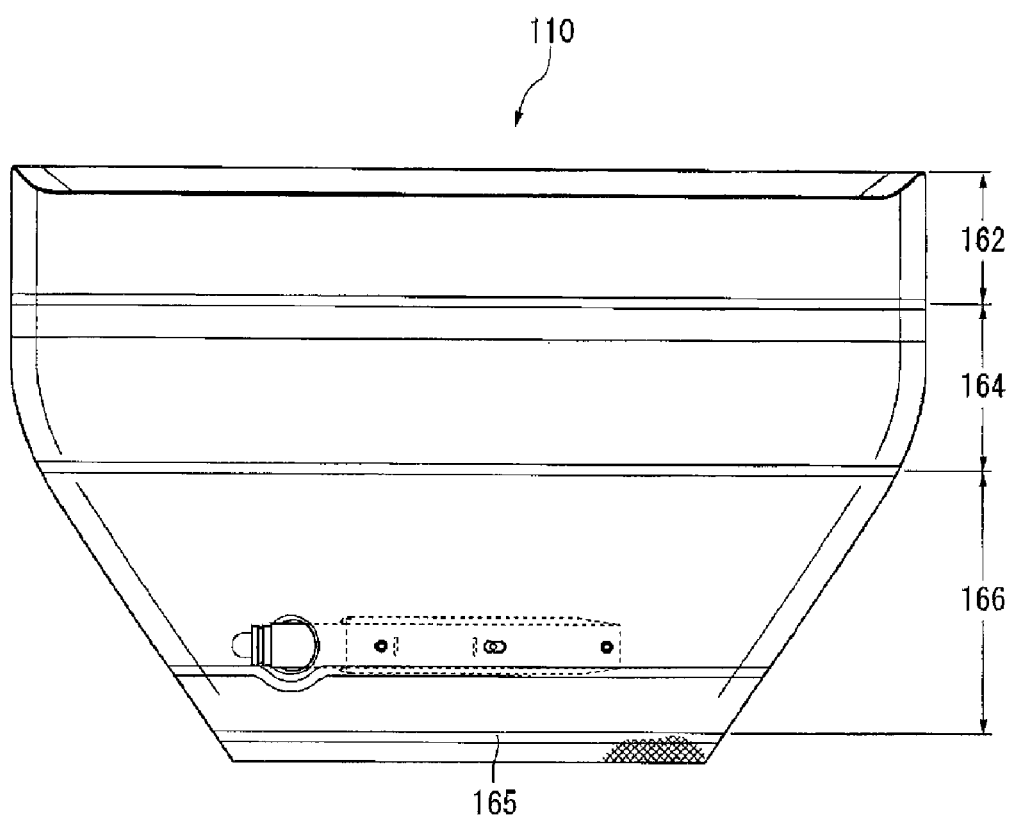
FIG. 10 illustrates the process of folding the cushion section shown in FIG. 9.
Figure 11:
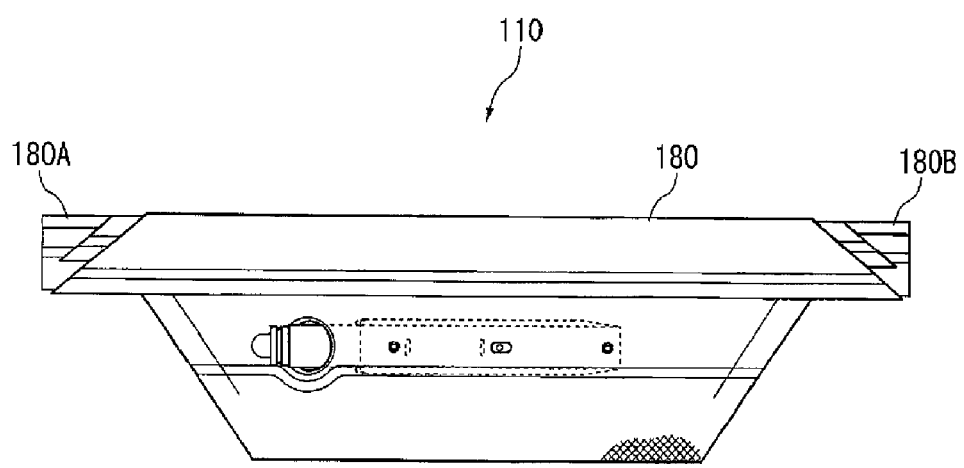
FIG. 11 further illustrates the process of folding the cushion section shown in FIG. 10.
Figure 12:
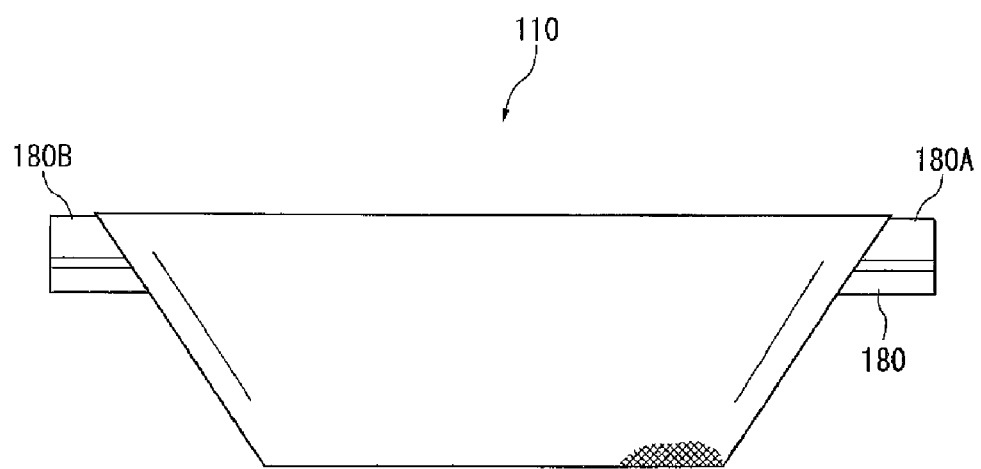
FIG. 12 illustrates the process of folding the cushion section shown in FIG. 9 and is shown in which the cushion section is turned over so that the roll section formed as shown in FIG. 11 faces the rear side in the figure.

FIG. 10 to FIG. 15 illustrate the steps of folding the cushion section 110 shown in FIG. 9(a). As shown in FIG. 10, the cushion section 110 is initially folded a plurality of times or wound from the first chamber 162 toward the third chamber 166. As a result, a roll section 180 is formed as shown by way of example in FIG. 11. FIG. 12 shows a state in which the cushion section 110 is turned over so that the roll section 180 formed as shown in FIG. 11 faces toward the rear side as shown in the figure.

Figure 13:
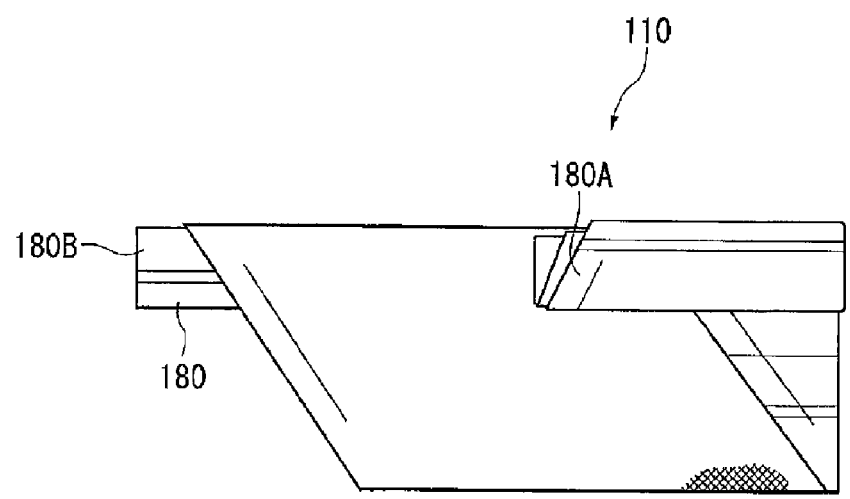
FIG. 13 further illustrates the process of folding the cushion section shown in FIG. 12.
Figure 14:
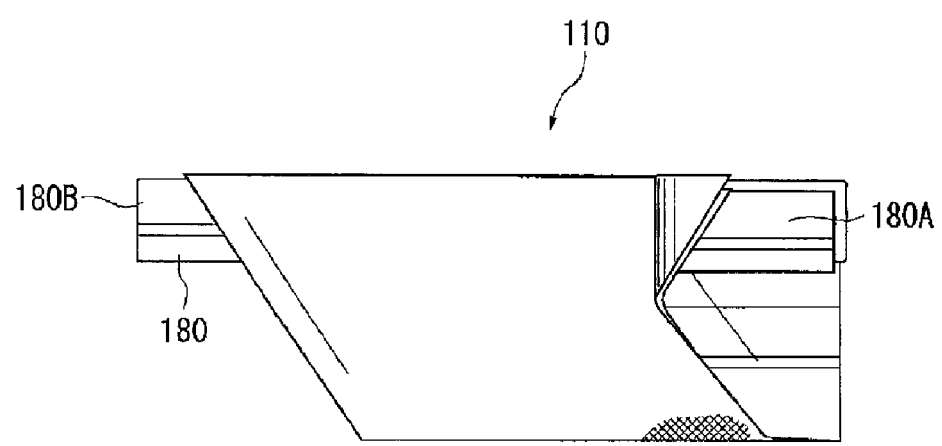
FIG. 14 illustrates the further process of folding the cushion section shown in FIG. 13.
Figure 15:
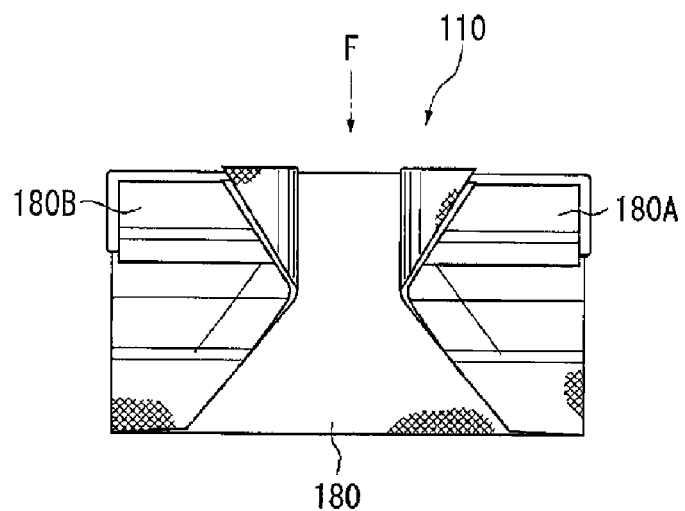
FIG. 15 further illustrates the process of folding the cushion section shown in FIG. 14.

As shown by way of example in FIG. 13, one end 180A of the roll section 180 is folded back toward the side opposite that where the roll section 180 has been formed. This will be referred to hereinbelow as the first folding. FIG. 14 shows a state in which the tip of the one end 180A of the roll section 180 that has been subjected to the first folding is further folded back in the direction of both ends of the roll section 180. This will be referred to hereinbelow as the second folding. Those first folding and second folding operations are performed, as shown in FIG. 15, with respect to both ends 180A, 180B of the roll section 180. The folding is thus completed.

Figure 16:
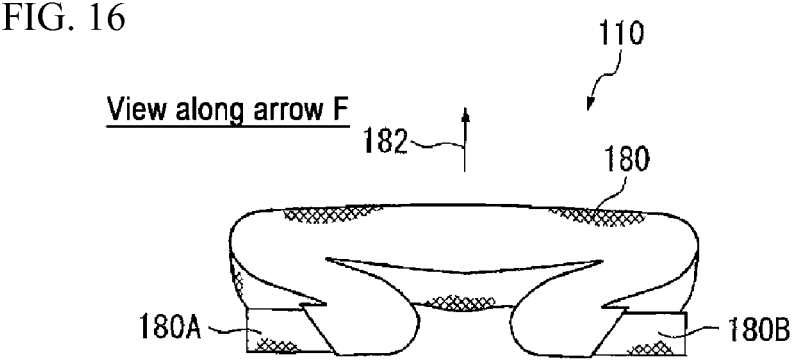
FIGS. 16(a)-16(c) illustrate the deployment behavior of the cushion section shown in FIG. 15.
Figure 16:
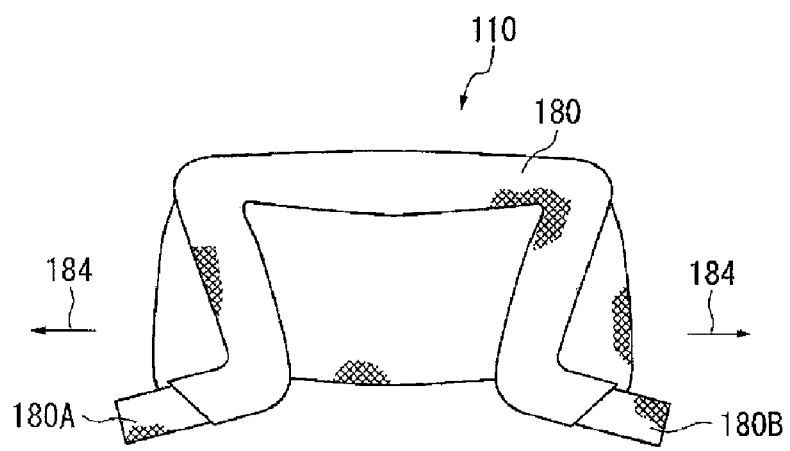
Figure 16:
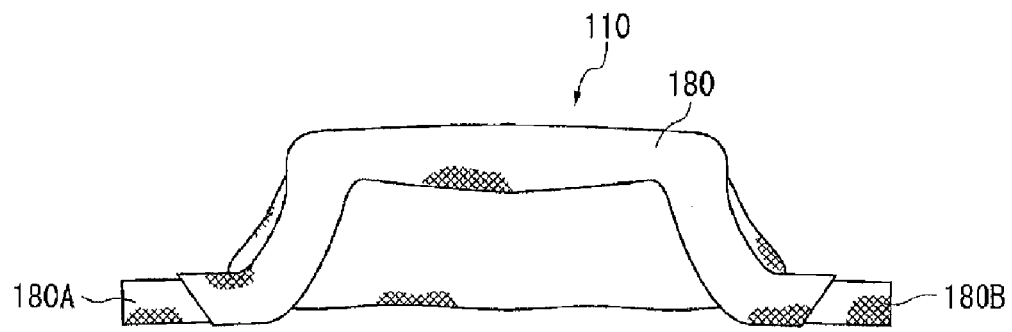

FIGS. 16(a)-16(c) illustrate the deployment behavior of the cushion section 110 that has been folded as shown in FIG. 15. FIG. 16(a) corresponds to a view along an arrow F in FIG. 15. The deployment proceeds in the order of configurations shown in FIGS. 16(a), 16(b), and 16(c). As viewed by the occupant seating in the driver's seat shown in FIG. 1, the folded cushion section 110 has such a posture, and although it is actually not seen by the occupant, the cushion section is oriented as a substantially Q-like shape with respect to the occupant.

In the case of the cushion section 110 that has been folded or wound as explained with reference to FIG. 10 to FIG. 15, the deployment behavior is not the exact reversal from the very end to the very beginning of the folding step. Thus, as shown by way of example in FIG. 16(a), the deployment (arrow 182) of the roll section that is formed on the initial stage of the folding proceeds before the deployment (arrow 184 in FIG. 16(b)) in the left-right direction of the double fold obtained by the first folding and second folding performed at the very end of the folding step.

Since the roll section 180 is thus deployed in advance at a point of time in which the double fold is still present, torsion is generated in the cushion section 110. As a result, a damage 190 occurs on the trajectory of the second folding line 188, from among the first folding line 186 and second folding line 188 (only left side is shown in the figure) located on the inner surface of the cushion section 110, as shown in FIG. 9. In particular, since the first chamber 162 is positioned on the innermost side of the roll section 180, it is not deployed till the very end and friction easily occurs on the inner surface under the effect of torsion. For this reason, the damage 190 most often occurs on the trajectory of the second folding line 188 that is present on the inner surface of the first chamber 162.

However, in the present embodiment, since the inner surface of the first chamber 162 is formed from the dissimilar coated cloth 172A and non-coated cloth 174A, the damage is unlikely to occur even when friction occurs.

The idea of the present embodiment relating to the materials of the inner surface of the cushion section 110 is described below. According to the present embodiment, in the airbag of a configuration including one or more chambers (for example, knee airbag 100), the airbag is folded or wound, and a cloth is provided inside a chamber (for example, the chamber 162) at a location (for example, close to the damage 190) where the unfolding or unwinding of the airbag proceeds slower than in other portions.

The abovementioned configuration is selected because the probability of damage is higher in the portions where the unfolding or unwinding proceeds slower than in other portions.

The abovementioned cloth may be provided on the innermost side of the folded or wound body at a position at a distance from the inflator accommodated in the airbag.

The abovementioned configuration is selected because the folded or wound state is maintained till the very end at such a position when the airbag is deployed.

The abovementioned cloth may be a non-coated cloth (for example, non-coated cloth 174A) that is not coated with silicone.

Figure 17:
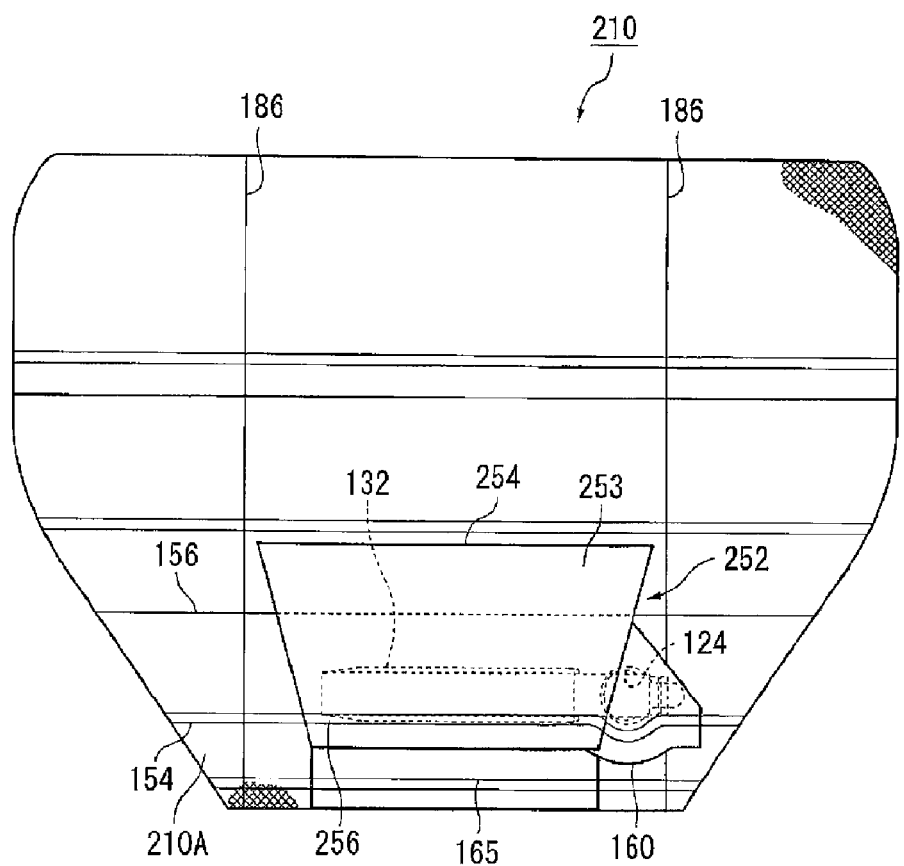
FIG. 17 illustrates the cushion section having an alternate diffuser than the diffuser shown in FIG. 6.

FIG. 17 illustrates a cushion section 210 having a diffuser 252 obtained by changing the diffuser 152 shown in FIG. 6. Only the difference between the changed diffuser and that shown in FIG. 6 is described below. The diffuser 152 shown in FIG. 6 has a tubular portion 153 having a rectangular cross section, whereas a tubular portion 253 of the diffuser 252 shown in FIG. 17 has a trapezoidal cross section.

In other words, the diffuser 252 is formed by folding back hexagonal cloths along any diagonal and stacking the substantially congruent and left-right symmetrical trapezoidal cloths by taking the diagonal along which the cloths have been folded as an upper base 254. The portion corresponding to the lower base 256 of the trapezoid is sewed to a foundation cloth 210A by the first sewing line 154. The inflator 122 is inserted together with the deflector 132 into the tubular portion 253 close to the lower base 256.

As shown in FIG. 17, the diffuser is folded back at both outer sides of the portion corresponding to the lower base 256 of the diffuser 252 along the creases (first folding lines 186) that are substantially orthogonal to the longitudinal direction of the diffuser 252.

With the above-described configuration, no choking occurs in the cushion section 210 and the deployment proceeds rapidly. This is because the lower base 256, which has a small length, does not engage with the first folding lines 186, and the inflator 122 is inserted close to the lower base 256, as a result of which the gas outlet ports are not closed.

Figure 18:
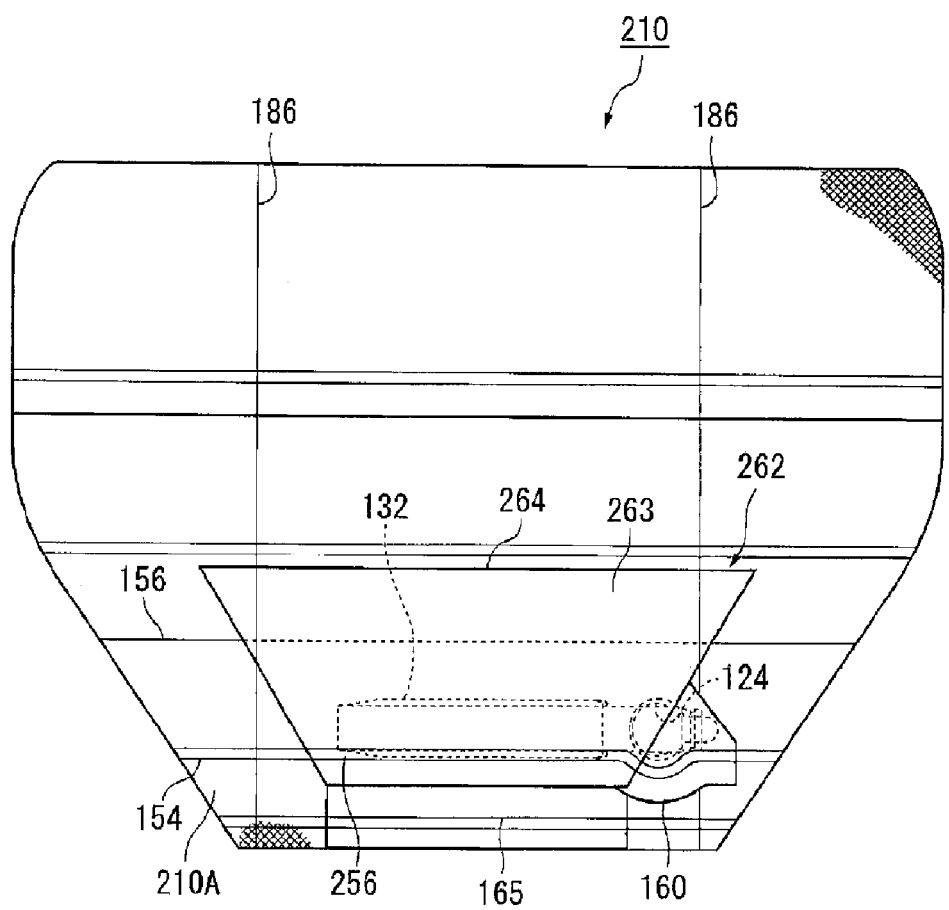
FIG. 18 illustrates the cushion section having a further alternate diffuser than the diffuser shown in FIG. 17.

FIG. 18 illustrates a cushion portion 210 having a diffuser 262 that is obtained by further changing the diffuser 252 shown in FIG. 17. Only the difference between the changed diffuser and that shown in FIG. 17 is described below. An upper base 264 of the diffuser 262 shown in FIG. 18 is longer than the upper base 254 shown in FIG. 17 and becomes a tubular portion 263 that reaches the first folding lines 186, which are the creases of the first folding. In other words, the first folding lines 186 are positioned on the inner side of both ends of the portion corresponding to the upper base 264 of the diffuser.

With the above-described configuration, the portions of the upper base 264 of the diffuser 262 engage with the first fold. However, since the vicinity of the lower base 256 where the inflator 122 and the deflector 132 are present does not engage with the first folding lines 186, no choking occurs. Meanwhile, rapid deployment is ensured since the portions of the upper base 264 are increased in length in the course of engagement with the first folding lines 186.

The idea of the present embodiment relating to the variation examples of the diffuser is summarized below. According to the present embodiment, in a knee airbag in which the cylinder-type inflator 122 is accommodated in the internal diffuser 252, a roll section (for example, the roll section 180) is formed by folding or winding in an accordion-like or roll-like configuration in the knee airbag, and both ends of the roll section are folded back to the center (for example, the first folding), and the outlet ports of the diffuser are not engaged with the folding lines (for example, the first folding lines 186). As a result, no choking occurs.

Further, in the above-described variation examples, the tubular portions 253, 263 are used, but a diffuser of a closed bag-like shape, rather than the tubular shape, that is provided with a vent hole 270 to introduce gas may be also used.

The preferred embodiments of the present invention are described hereinabove with reference to the appended drawings, but the above embodiments are merely preferred examples of the present invention, and other embodiments may be also implemented or executed using various methods. In particular, the present invention is not limited to the shapes, dimensions, and arrangement of the components illustrated in detail in the appended drawings, unless specific limiting description to the contrary is provided in the specification of the present application. Further, expressions and terms used in the specification of the present application are employed for descriptive purposes only, and the present invention is not limited to these expressions and terms unless specifically stated otherwise. For example, all of the embodiments are explained using a knee airbag, but the present invention may be also applied to a variety of airbags provided in a vehicle, such as a driver seat airbag, a passenger seat airbag, a side airbag, and an inflatable curtain airbag.

Therefore, it is clear that a person skilled in the art could conceive of various variation examples or modification examples without departing from the scope defined by the claims, and those variation examples and modification examples are also construed to be included in the technical scope of the present invention.

The invention claim is:

1. A knee airbag internally accommodating an inflator, comprising:
    a cushion section;
    an insertion hole defined in the cushion section for inserting the inflator from an outside to an inside of the cushion section; and
    a diffuser located within the cushion section and into which the inflator that has been inserted from the insertion hole is inserted, the diffuser having a tubular portion obtained by folding a hexagonal cloth back along a diagonal of the hexagonal cloth thereby forming substantially congruent and left-right symmetrical trapezoidal cloths by taking the diagonal as an upper base and sewing a portion corresponding to a lower base of the trapezoidal cloths to a foundation cloth of the cushion section, and the inflator being inserted into the tubular portion adjacent to the lower base, wherein
    the cushion section being folded back at both outer sides along creases that are substantially orthogonal to the longitudinal direction of the diffuser and located longitudinally beyond the lower base of the diffuser.

2. The knee airbag according to claim 1, wherein the creases obtained by folding back are positioned longitudinally between both ends of the upper base of the diffuser.

3. A knee airbag in which an inflator is accommodated, comprising;
- a cushion section having an internal diffuser with outlet ports defined therein,
- a roll section formed in the cushion section by folding or winding in an accordion or roll configuration in the knee airbag, and both ends of the roll section being folded back to a center thereof to define folds, and
- the folds being formed in a position wherein the outlet ports of the diffuser are partially closed by the folds.

4. An airbag internally accommodating an inflator, the airbag being one of a knee airbag, a driver seat airbag, a passenger seat airbag, a side airbag and a curtain airbag, the airbag comprising:
- a cushion section having lateral sides;
- an insertion hole defined in the cushion section for inserting the inflator from an outside to an inside of the cushion section; and
- a diffuser located within the cushion section and into which the inflator that has been inserted from the insertion hole is inserted, the diffuser having a tubular portion obtained by folding a cloth portion back along itself at an upper base thereby forming substantially congruent cloth sections and sewing adjacent end portion defining a lower base of the cloth sections to a foundation cloth of the cushion section, and the inflator being inserted into the tubular portion adjacent to the lower base, and
- the cushion section being folded back at both lateral sides along creases that are substantially orthogonal to the longitudinal direction of the diffuser and located longitudinally beyond of the lower base of the diffuser.

5. The airbag according to claim 4, wherein the creases define a line traversing through the upper base.

6. The airbag according to claim 4, wherein the creases define a line traversing through the upper base but not the lower base.

7. The airbag according to claim 4, wherein the cloth portion is of a rectangular shape.

8. An airbag internally accommodating an inflator, the airbag being one of a knee airbag, a driver seat airbag, a passenger seat airbag, a side airbag and a curtain airbag, the airbag comprising:
- a cushion section having lateral sides;
- an insertion hole defined in the cushion section for inserting the inflator from an outside to an inside of the cushion section; and
- a diffuser located within the cushion section and into which the inflator that has been inserted from the insertion hole is inserted, the diffuser having a tubular portion obtained by folding a cloth portion back along itself at an upper base thereby forming substantially congruent cloth sections and sewing adjacent end portion defining a lower base of the cloth sections to a foundation cloth of the cushion section, and the inflator being inserted into the tubular portion adjacent to the lower base,
- the cushion section being folded back at both lateral sides along creases that are substantially orthogonal to the longitudinal direction of the diffuser and located longitudinally beyond of the lower base of the diffuser, and
- wherein the cloth portion is of a hexagonal shape.

9. An airbag in which an inflator is accommodated, the airbag being one of a knee airbag, a driver seat airbag, a passenger seat airbag, a side airbag and a curtain airbag, the airbag comprising;
- a cushion section having an internal diffuser with outlet ports defined therein,
- a roll section formed in the cushion section by folding or winding an accordion or roll configuration in the airbag, and both ends of the roll section being folded back to a center thereof to define folds, and
- the folds being formed in a position wherein the outlet ports of the diffuser are partially closed by the folds.

* * * * *